May 22, 1951          G. J. PALMER, JR          2,553,719
WEIGHT CONTROLLER FOR CONVEYERS
Filed Jan. 10, 1948          2 Sheets—Sheet 1
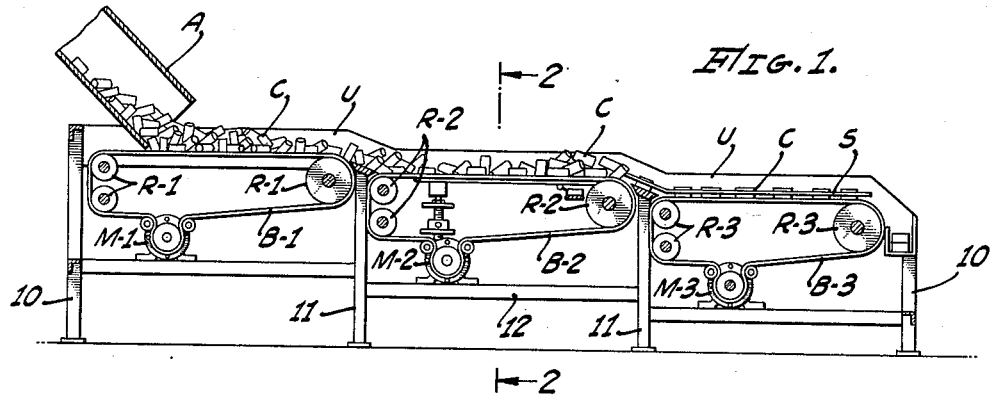
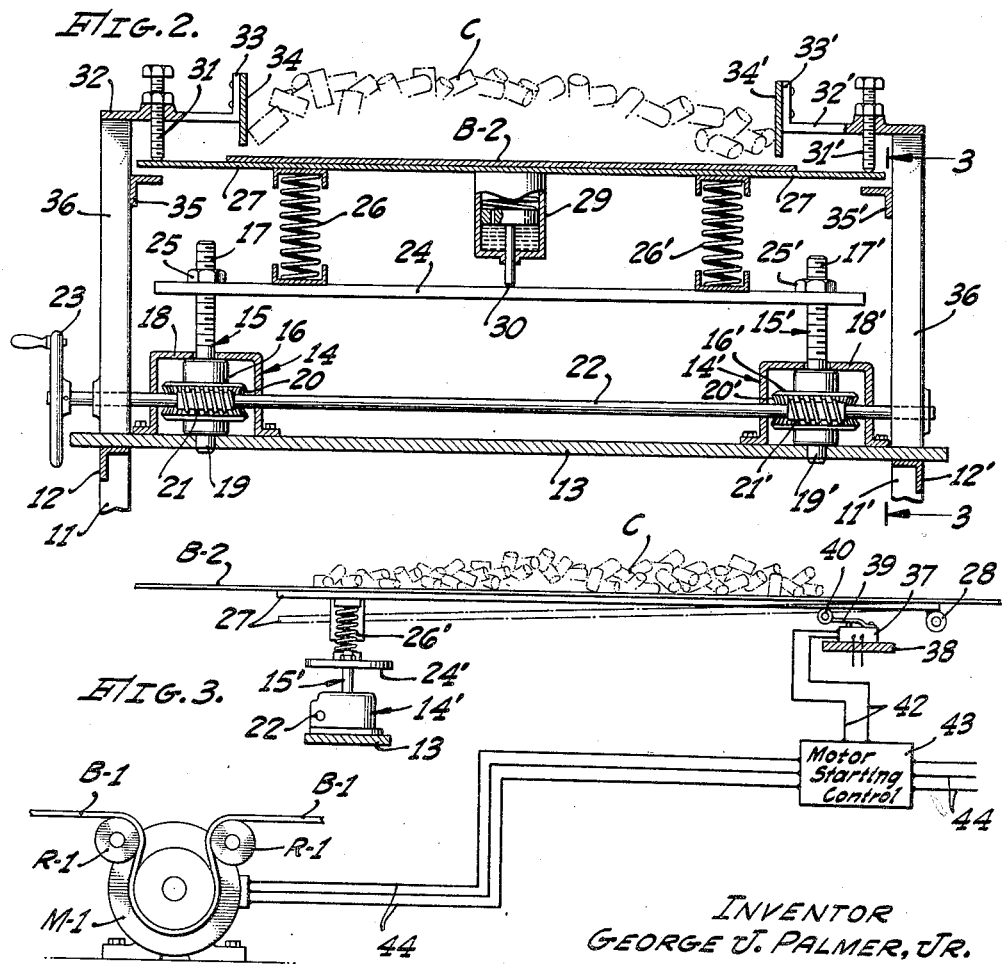
INVENTOR
GEORGE J. PALMER, JR.
BY
ATTORNEY.

May 22, 1951  G. J. PALMER, JR  2,553,719
WEIGHT CONTROLLER FOR CONVEYERS
Filed Jan. 10, 1948  2 Sheets-Sheet 2
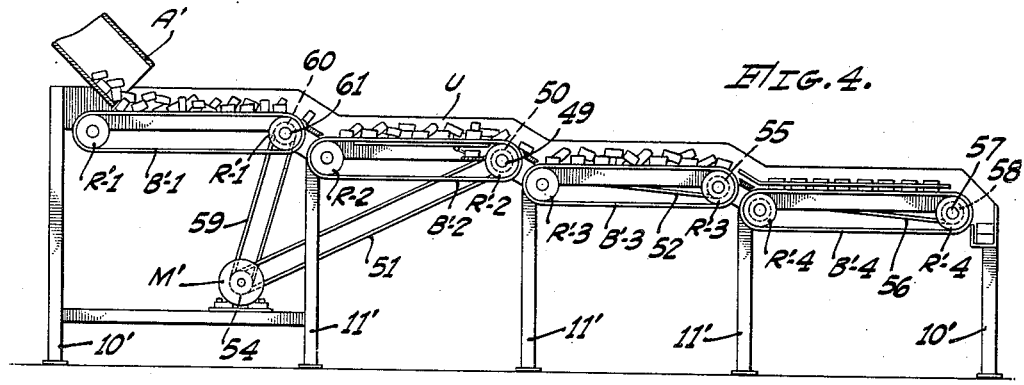
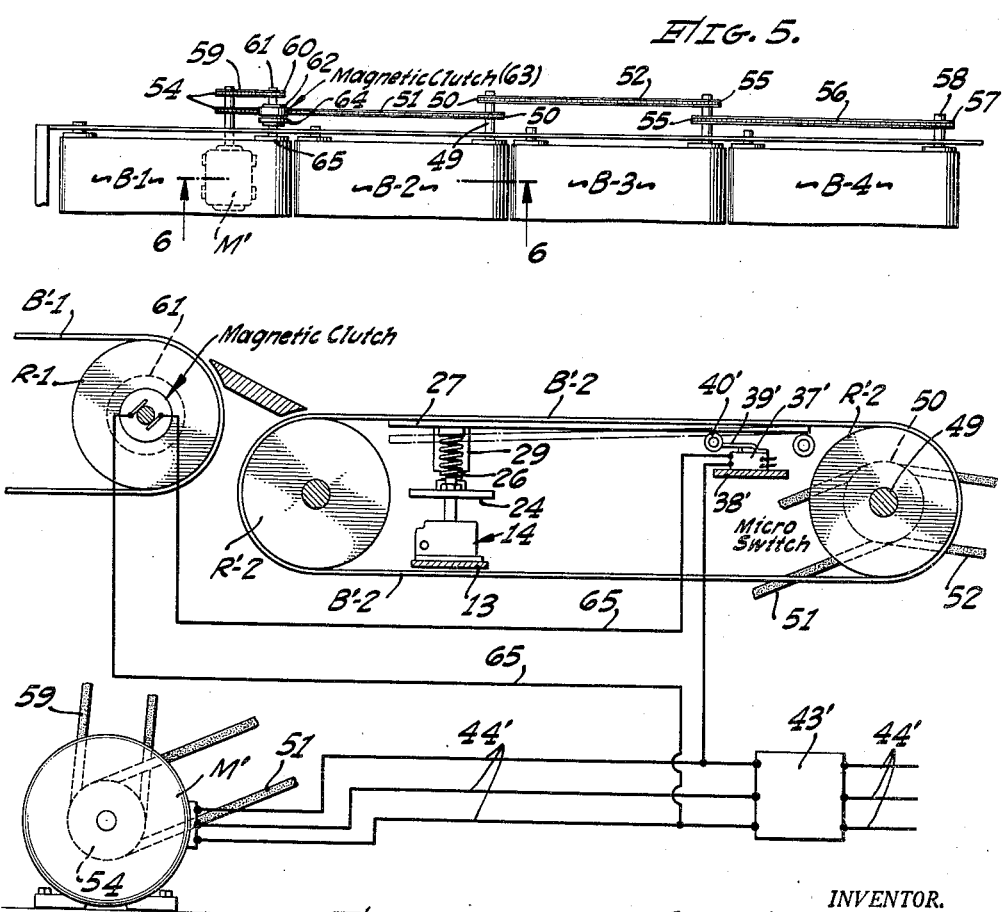
INVENTOR.
GEORGE J. PALMER, JR.
BY
ATTORNEY.

Patented May 22, 1951

2,553,719

UNITED STATES PATENT OFFICE 2,553,719

WEIGHT CONTROLLER FOR CONVEYERS

George J. Palmer, Jr., Long Beach, Calif.

Application January 10, 1948, Serial No. 1,604

5 Claims. (Cl. 198—37)

My invention relates to the field of canning machinery, and more particularly to a weight control for the conveyor belt of a can unscrambler whereby the unscrambler becomes entirely automatic in operation and is prevented from jamming due to being overloaded.

In the canning industry after food products have been placed in hermetically sealed cylindrical containers or cans they are normally labeled by passing through a machine which is adapted to automatically place glued labels thereon. However, prior to the cans entering the labeling machine it is necessary that they be aligned in an orderly fashion which is quite often achieved by causing the cans to pass through a machine known in the canning industry as an unscrambler. Although it is possible to construct an unscrambler in a number of different forms, one of the most common employs a series of longitudinally positioned conveyor belts disposed in tandem relation. In this type of machine the cans are dumped upon the forwardly positioned belt and are moved rearwardly, with each belt traveling at a greater speed than the preceding forwardly positioned belt in order that the cans will be longitudinally spaced with relation to one another. The cans are placed in alignment by passing between longitudinally extending guide strips which are situated above the most rearwardly positioned belts, with the result that as the cans emerge from the unscrambler they are properly positioned to enter a conveyor or machine to complete the next phase of the canning operation.

An unscrambler as such is not a new piece of equipment in the canning industry; but the previously available machines have had the disadvantage that they required the services of an operator to see that too large quantities of cans were not placed on the forwardly positioned belt thereof to cause a jam of cans at the discharge end of the unscrambling guide strips. It is to eliminate the necessity of an operator for an unscrambler, and to make the device fully automatic that I have devised my invention.

It is a major object of my invention to provide a weight control for a conveyor belt on a can unscrambler whereby jamming or overloading of the device is eliminated, and a suitable feed of cans for the labeling machine or case packer is automatically maintained from the discharge end of the unscrambler.

Another object of my invention is to prevent further cans from being delivered from the most forwardly positioned belt of the unscrambler until the weight of cans resting upon one of the belts has been reduced below a predetermined weight, that will accomplish this result automatically without an operator being present, will be adjustable as to the weight of cans necessary to be present on a conveyor belt to prevent further cans from being delivered thereto, will be of an extremely simple mechanical structure, can be installed equally well on either new or old machines, will be inexpensive to manufacture, and can be sold at such a reasonable price that its cost will be saved in a short time by the elimination of the need for an operator to supervise the unscrambler.

These and other objects and advantages of my invention will become apparent from the following description of a preferred form and modification thereof, and from the drawing illustrating those forms in which Fig. 1 is an elevational view of a conventional can unscrambler with my conveyor belt weight controller installed thereon;

Fig. 2 is a vertical cross-sectional view of the weight control device taken on the line 2—2 in Fig. 1;

Fig. 3 is a vertical cross-sectional view of the control device taken on the line 3—3 in Fig. 2;

Fig. 4 is an elevational view of a modified form of unscrambler that is driven by a single motor, with my weight controller installed on the second belt thereof;

Fig. 5 is a plan view of the modified form of the device showing the magnetic clutch that controls the movement of the forwardly positioned belt; and Fig. 6 is a fragmentary vertical cross-sectional view of the control device used with the modified form of the device taken on the line 6—6 of Fig. 5.

Referring now to Fig. 1 for the general arrangement of the preferred form of my invention it will be seen that a conventional can unscrambler U includes three longitudinally disposed conveyor belts B—1, B—2 and B—3, each of which is rotatably supported on a series of rollers R—1, R—2 and R—3 that are moved by individual electric motors M—1, M—2 and M—3 respectively. It will be apparent that additional conveyor belts can be used on the unscrambler U if desired, and that it can be actuated by a single motor as in the modified form of my device as will hereinafter be explained. Cans C are deposited as a mass from a bucket or chute A on the conveyor belt B—1, and are moved rearwardly to be placed in proper alignment with one another on the belt B—3 by passing between a number of longitudinally extending guide strips S situated thereover. As the cans C are discharged from the belt B—3 other cans are moving rearwardly on the belt B—2, with the delivery of cans to the latter belt being controlled by my invention which is situated thereunder. Thus cans C are prevented from being delivered to the belt B—2 except when the weight of cans resting thereon is under a predetermined amount which insures that there will be no jamming of cans from the delivery end of the belt B—3.

Although the unscrambler U can be fabricated in several different ways it is preferably formed with a rectangular steel framework 10 of conventional design. The frame used in supporting the belt B—2 is constructed from four laterally spaced upright members 11 which are held together as an integral unit by suitable cross-bracing, and a pair of horizontal side members 12 and 12', each of which extends between the uprights on one of the longitudinal sides of the frame 10. A transversely disposed bar 13 of rectangular cross-section extends between the side members 12, and is preferably affixed to the under sides thereof by welding. Mounted on the upper surface of the bar 13 at each end thereof are inverted U-shaped brackets 14 and 14', each of which rotatably supports a substantially vertical shaft 15 and 15' respectively.

It will be noted in Fig. 2 that each of the shafts 15 and 15' is provided on the lower end thereof with a worm gear 16 and 16' respectively, with each of the gears being situated within the confines of one of brackets 14. The upper portions of the shafts 15 which are situated above the horizontal connecting arms of the brackets 14 are formed with threads 17 the purpose of of which will hereinafter be explained. Each of the worm gears 16 and 16' is engaged by a worm 21 and 21' respectively, which are mounted on a horizontally positioned shaft 22 that is rotatably supported between conveniently located members of the frame 10. In order that the shaft 22 can be manually rotated, a hand wheel 23 is affixed to one of the ends thereof. A transversely positioned bar 24 of rectangular cross-section is movably supported between the shafts 15 by being welded to the under side of a pair of nuts 25, each of which engages one of the threaded shaft portions 17.

Supported on the upper surface of the bar 24 near each end thereof is a vertically positioned helical spring 26 which is affixed to the bar in a conventional manner. Each of the springs 26 supports on its upper end the forward portion of a flat rectangular plate 27 that is somewhat wider than the conveyor belt B—2, and is hinged on its rearward end on a horizontal rod 28 which extends across the upper portion of the frame 10 as can best be seen in Fig. 3. In the conventional unscrambler a plate 27 is furnished; but it occupies a rigid position rather than being vertically movable. A shock absorber 29 of conventional design is centrally disposed between the springs 26, with its upper portion affixed to the lower face of the plate 27, and the lower end of its movable plunger 30 resting on the upper face of the bar 24.

Thus, upon the hand wheel 23 being rotated, the vertical shafts 15 are likewise rotated, and the bar 24 together with the springs 26 mounted thereon are moved either upwardly or downwardly. As upward movement of the bar 24 occurs the outer longitudinal portions of the plate 27 come into contact with the lower ends of a pair of downwardly extending adjustment bolts 31, each of which is movably supported from an upper longitudinally positioned side member 32 that is rigidly affixed to two of the uprights 11. Each of the side members 32 is normally provided on a conventional unscrambler as a member of L-shaped cross-section having an inner flange 33 that extends vertically upward to hold the cans C on the belt B—2, and in addition furnishes a support for a longitudinally extending rectangular strip 34 which prevents the cans from rolling outwardly under the member 32. Situated directly under the lower end of each of the adjustment bolts 31 is an inverted L-shaped bracket 35 that is supported from a vertical member 36 which in some cases can be a portion of the unscrambler frame 10. Thus, as the longitudinal portions of the plate 27 are situated between the lower ends of the adjustment bolts 31 and the horizontal arms of the brackets 35, the vertical movement of the plate is restricted by these members. It will be apparent that were it not for the adjustment bolts 31, the springs 26 when in compression would force the plate 27 against the lower face of the belt B—2 to increase the frictional resistance when the belt is moving.

An electric switch 37 which is normally in the closed position is mounted on a suitable cross piece 38. The switch 37 is provided with an actuating arm 39 having a rotatably mounted roller 40 on its forward end that is in contact with the lower surface of the plate 27. As the amount of cans C on the belt B—2 increases in weight the plate 27 pivots downwardly on the rod 28 until a position is reached, such as shown by phantom line in Fig. 3, in which the switch 37 is placed in the open position. Switch 37 is connected by conductors 42 to one phase of a three phase electric current which is carried by conductors 44 to a motor starting control 43 and thence to the motor M—1 in a conventional manner. Upon the conveyor belt B—2 becoming overloaded with cans C the plate 27 pivots downwardly until stopped by the brackets 35, and places the switch 37 in the open position which de-energizes the control 43. As a result the electric circuit to the motor M—1 is temporarily broken, and the conveyor belt B—1 stops operating until such time as the weight of cans resting on the belt B—2 is reduced sufficiently by rearward movement of the belt to permit the springs 26 to move the plate 27 upwardly to re-establish an electric circuit to the motor M—1 through switch 37.

The installation of my device is extremely simple, and it is adapted for use with either a new or old unscrambler. In the operation of an unscrambler equipped with my device the weight of cans C necessary to be present on the belt B—2 to stop movement of cans from the belt B—1 thereto is determined by the degree of compression of the springs 26. It will be noted in Fig. 2 that as the hand wheel 23 is rotated in one direction the bar 24 is moved upwardly, and the springs 26 compressed due to upward movement of the plate 27 being restricted by the position of the lower ends of the bolts 31. Thus, the greater the compression of the springs 26, the greater must be the weight of cans C resting on the belt B—2 to cause the necessary downward movement of the plate 27 to break the electric circuit to the motor M—1. Conversely, when it is desired to regulate the device so that less cans C need be present on the belt B—2 to stop movement of cans from the belt B—1, the hand wheel 23 is rotated in the opposite direction to move the bar 24 downwardly to lessen the compression on springs 26. It will be noted that as upward movement of the plate 27 is restricted by the bolts 31 that the amount of frictional resistance between the belt B—2 and the plate 27 remains constant irrespective of the amount of compression the springs 26 may be under.

Although it is desirable to have the belt B—1 stop operating when the belt B—2 becomes overloaded, it frequently happens that the belt B—2 is momentarily overloaded due to the shock imposed by a large mass of cans being moved thereon from the belt B—1. To eliminate the stopping of the belt B—1 by this temporary overloading of the belt B—2 I have provided the shock absorber 29 which causes a time delay in the plate 27 moving downwardly, and thus prevents intermittent stopping of the belt B—1 unless the belt B—2 is actually overloaded.

Shown in Figs. 4, 5 and 6 is a modification of my device as applied to an unscrambler U' that is operated by a single motor M'. In construction the unscrambler U' is fabricated with a framework 10' that is identical in construction with the previously described framework except that four conveyor belts B'—1, B'—2, B'—3 and B'—4 are rotatably supported therefrom on transversely positioned pairs of rollers R'—1, R'—2, R'—3 and R'—4 respectively. Affixed to a horizontally positioned shaft 49 that rotatably supports the rearwardly positioned roller R'—2 is a double sprocket 50. The sprocket 50 is engaged by two belts 51 and 52, with belt 51 extending forwardly and downwardly to engage one of two driving sprockets 54 on a motor M', and the belt 52 proceeding forwardly to engage one of two sprockets 55 affixed to a shaft that rotatably supports the rearwardly positioned roller R'—3. The other sprocket 55 engages a belt 56 that is movably connected to a sprocket 57 which is rigidly mounted on a rotatably supported shaft 58 that supports the rearwardly positioned roller R'—4. Thus upon the motor M' being operated the three conveyor belts B'—2, B'—3 and B'—4 are rotated by means of the above described sprocket arrangement.

Etxending upwardly from the other of the two driving sprockets 54 is a belt 59 that engages a sprocket 60 which is rigidly mounted on a rotatably supported shaft 61. The shaft 61 supports on its interior end a driving plate 62 which is a component part of an electrically operated magnetic clutch 63 of conventional design, with the plate 62 upon being electrically energized engaging a plate 64 that is mounted on the end of a horizontally positioned shaft 65 which drives the rearwardly positioned roller R'—1.

To supply an electric current to energize the clutch 63 whereby the conveyor belt B'—1 is only driven when the belt B'—2 is not overloaded with cans C, the previously described form of my weight control device is used as can best be seen in Fig. 6, with the electric wiring used in connection therewith being slightly modified.

The motor M' is supplied with three phase electric power through a circuit that includes the conventional starting control 43' and conductors 44'. As previously explained, the switch 37 is normally in the closed position and supplies one phase electric power through the conductors 65 to the magnetic clutch 62 in a conventional manner to keep same in an actuating position when the weight of cans resting on the conveyor belt B'—2 is not sufficient to place the switch in the open position. Of course, should the belt B'—2 become overloaded the plate 27 will be rotated downwardly to open the switch 37 whereupon the magnetic clutch 63 will be de-energized, and the belt B'—1 will stop operating until the weight of cans C resting on the belt B'—2 is reduced by rearward movement of the belt sufficiently to permit the springs 26 to return the switch 37 to the closed position. Thus, the conveyor belt B'—1 is stopped and started intermittently by the clutch 63 to supply cans C to the belt B'—2 in the same manner as in the preferred form of my invention.

I have found that my weight control for a conveyor belt works equally well on machines of a type different than either of the above described applications, and that in its installation in an existing machine considerable time and material can be saved by taking advantage of the existing framework of the machine for its support. It will be apparent that the location of the motors M, M' and the conveyor belt supporting rollers R, R' will vary from machine to machine, but that this will in no way prevent or hinder the use of my invention in controlling the weight of material that is placed on a conveyor belt before same stops operating. It will also be obvious that although I have shown a definite number of conveyor belts in the above illustrations that this number can be increased or decreased, and if desired each belt can be equipped with my device to prevent it from being overloaded.

While the particular apparatus herein shown and described in detail is fully capable of attaining the objects and providing the advantages hereinbefore stated it is to be understood that it is merely illustrative of the presently preferred forms of my invention, and that I do not mean to limit myself to the details of construction or design herein shown other than as defined in the appended claims.

I claim:

1. A control device for regulating the weight of material on a conveyor belt which includes: a plate adapted to be moved by the weight of material on a conveyor belt; weight control means adapted to be actuated by the movement of said plate; spring means for supporting said plate; and means for varying the compression on said spring means whereby said plate will not actuate said control means until a predetermined weight of material for which said spring means is set is deposited on said conveyor belt.

2. A control device for regulating the weight of material on a conveyor belt which includes: a pivoted plate adapted to be moved by the weight of material on a conveyor belt; weight control means adapted to be actuated by the movement of said plate; spring means for supporting said plate; a member adapted to support said spring means; and means for vertically moving said member whereby the compression on said spring means is varied to permit said plate to actuate said control means only when a predetermined weight of material for which said spring means is set is deposited on said conveyor belt.

3. A control device for regulating the weight of material on a conveyor belt which includes: a pivoted plate adapted to be moved by the weight of material on a conveyor belt; weight control means adapted to be actuated by the movement of said plate; spring means for supporting said plate; a member adapted to support said spring means; means for vertically moving said member whereby the compression on said spring means is varied to permit said plate to actuate said control means only when a predetermined weight of material for which said spring means is set is deposited on said conveyor belt; and shock absorber means positioned between said member and plate whereby temporary overloading of said conveyor belt will not cause the actuation of said weight control means.

4. A control device for regulating the weight of material on a conveyor belt which includes: a conveyor belt; a pivoted plate mounted under said belt and adapted to be moved by the weight of material on said belt, with the longitudinal portions of said plate extending outwardly from said belt; an upright member provided on each longitudinal side of said plate; a longitudinally extending member mounted on each of said uprights, and adapted to prevent material falling from said conveyor belt; an adjustment bolt movably supported on each of said uprights, with each of said bolts adapted to engage the upper surface of said plate; a plurality of springs supporting said plate; a substantially horizontal bar supporting said springs, and provided with a plurality of tapped openings; a plurality of vertical shafts, with each of said shafts engaging one of said tapped openings; a plurality of worm gears, with each of said worm gears being affixed to one of said shafts; a substantially horizontal shaft provided with a plurality of worms, with each of said worms engaging one of said worm gears; a hand wheel affixed to said horizontal shaft for rotating same whereby the compression on said springs is varied as said plate is moved upwardly into contact with the lower ends of said bolts; and weight control means adapted to be actuated by the downward movement of said plate when a predetermined weight of material for which said springs are set is deposited on said conveyor belt.

5. A weight control to prevent the jamming of a can unscrambler which includes: a plurality of longitudinally positioned conveyor belts in series adapted to move a plurality of cans therealong; a plurality of guides for unscrambling said cans operatively associated with said belts; a pivoted plate adapted to be moved by the weight of cans on one of said belts, with the longitudinal portions of said plate extending outwardly from said belt; an upright member provided on each longitudinal side of said plate; an adjustment bolt movably supported from each of said uprights, with each of said bolts adapted to engage the upper surface of said plate; a plurality of springs supporting said plate; a substantially horizontal bar supporting said springs, and provided with a plurality of tapped openings; a plurality of vertical shafts, with each of said shafts engaging one of said tapped openings; a plurality of worm gears, with each of said gears being affixed to one of said shafts; a substantially horizontal shaft provided with a plurality of worms, with each of said worms engaging one of said worm gears; a hand wheel affixed to said horizontal shaft for rotating same whereby said springs are compressed as said plate is moved upwardly into contact with the lower ends of said bolts; and weight control means adapted to be actuated by the movement of said plate when a predetermined weight of cans for which said springs are set is deposited on one of said belts whereupon said control means stops the movement of a portion of said belts delivering said cans to said unscrambling guides until the weight of the cans resting on said conveyor belt causing the actuation of said weight control has been reduced below said predetermined weight by the movement of said belt.

GEORGE J. PALMER, Jr.

REFERENCES CITED

The following references are of record in the file of this patent:

UNITED STATES PATENTS

| Number | Name | Date |
| --- | --- | --- |
| 698,379 | Elizondo | Apr. 22, 1902 |
| 1,059,005 | Schaffer | Apr. 15, 1913 |
| 1,430,766 | Stebler | Oct. 3, 1922 |
| 1,777,670 | Hausman | Oct. 7, 1930 |
| 1,972,489 | Rideout | Sept. 4, 1934 |
| 2,267,114 | Lear | Dec. 23, 1941 |
| 2,323,368 | Biedess | July 6, 1943 |
| 2,345,931 | Gates | Apr. 4, 1944 |